(12) United States Patent
Kim et al.

(10) Patent No.: US 7,967,490 B2
(45) Date of Patent: Jun. 28, 2011

(54) BACKLIGHT UNIT OF DIRECT TYPE

(75) Inventors: Dong-Soo Kim, Ansan-si (KR); Hwa-kyung Choi, Deagu (KR)

(73) Assignee: Alti-Electronics Co., Ltd. (KR)

( * ) Notice: Subject to any disclaimer, the term of this patent is extended or adjusted under 35 U.S.C. 154(b) by 363 days.

(21) Appl. No.: 12/147,714

(22) Filed: Jun. 27, 2008

(65) Prior Publication Data

US 2009/0002988 A1    Jan. 1, 2009

(30) Foreign Application Priority Data

Jun. 29, 2007    (KR) .................. 10-2007-0065360

(51) Int. Cl.
*F21V 7/04*    (2006.01)
*G09F 13/04*   (2006.01)

(52) U.S. Cl. ...................... 362/612; 362/97.1

(58) Field of Classification Search .......... 362/600–634, 362/97.1–97.4, 294, 345, 373, 249.02–249.07, 362/218–225, 545, 547, 249.01–249.11, 362/368, 419–430; 361/676–678; 349/161; 348/748–749; 353/52–61

See application file for complete search history.

(56) References Cited

U.S. PATENT DOCUMENTS

2006/0002142 A1 *    1/2006   Jeong et al. .................. 362/612
2007/0002590 A1 *    1/2007   Jang et al. ................... 362/612

FOREIGN PATENT DOCUMENTS

| KR | 1020070052315 | 5/2007 |
| KR | 1020070057462 | 6/2007 |
| KR | 100875703 | 12/2008 |

\* cited by examiner

*Primary Examiner* — Sharon E Payne
*Assistant Examiner* — William J Carter
(74) *Attorney, Agent, or Firm* — The Farrell Law Firm, P.C.

(57) ABSTRACT

The present invention provides a backlight unit including an LED module and a frame separately, and each separated part is stable and is capable of simple use and assembly. The backlight unit of direct type includes a plurality of makeup LED modules including an LED package of direct type on a PCB and a heat sink releasing heat generated from driving the LED package of direct type, a reflection plate reflecting light emitted from the makeup LED module to a front face, and attached at the remaining surface except for the makeup LED packages, an optical sheet disposed on the reflection plate, and improving brightness and uniformity of the light emitted from the makeup LED module and the reflection plate, and guide the light into a front face of the optical sheet and a frame including a guide rail to combine the makeup LED module by a sliding combination.

6 Claims, 4 Drawing Sheets

BACKLIGHT UNIT OF DIRECT TYPE

PRIORITY

This application claims priority under 35 U.S.C. §119 to Korean Patent Application No. 10-2007-0065360, filed on Jun. 29, 2007 in the Korean Intellectual Property Office (KIPO), the contents of which are herein incorporated by reference in their entirety.

BACKGROUND OF THE INVENTION

1. Field of the Invention

The present invention relates to a backlight unit for a liquid crystal display ("LCD") apparatus. More particularly, the present invention relates to a backlight unit including a light-emitting module ("LED") module and a frame separately, so that each separated part is stable and is capable of simple use and assembly.

2. Description of the Related Art

As the society is rapidly changed into information society recently, the needs for a flat display apparatus, which has excellent properties such as slim shape, light-weight, low power consumption and so on, has been increased. As one of those flat display apparatus, a liquid crystal display ("LCD") apparatus is better at resolution, color display, display quality and so on, so that the LCD apparatus is applied to monitors of a notebook and a desktop computer and an LCD television.

Generally, in the LCD apparatus, two substrates respectively having electrodes generating electrical fields are disposed to face the surfaces, at which two electrodes are formed, to each other. Liquid crystal materials are injected between two substrates, and the liquid crystal molecules are moved by the electrical field generated by applying voltages to two electrodes. An image is displayed by a transmittance of the light, which is changed according to the change of the electrical field.

However, the LCD apparatus needs an external light source because the LCD apparatus could not generate light by itself and just adjusts the transmittance of the light.

Thus, a backlight is disposed at a rear surface of an LCD panel, and the light emitted from the backlight is irradiated into the LCD panel, and a light amount is adjusted according to an arrangement of the liquid crystal to display an image.

The backlight is classified into a direct type and an edge type. In the direct type, a light source is disposed under the LCD panel, and emits light directly into a front surface of the substrate. In the edge type, a light source is disposed at a side or both sides of the LCD panel, and the light is reflected and diffused by a light guide plate ("LGP") or a reflection plate. The direct type does not need the LGP since the light of the lamp is irradiated directly into the LCD panel. The edge type needs the LGP, which guides the light from the side lamp into the front face. Generally, the backlight used in the notebook or the LCD monitor applies the edge type because of spotless, thin shape and low power consumption. The direct type is applied to a large screen LCD apparatus because of high light efficiency, simple operation, limitless of display surface.

For high brightness in the backlight of the direct type, the number of light sources may be increased. When the components are replaced in an assembly process or a using process of an LCD apparatus having a lot of light sources according to defection or failure of each component, all of the components are disassembled, and replaced and re-assembled, so that the replacing work is inconvenient.

SUMMARY OF THE INVENTION

The present invention provides a backlight unit of a direct unit including a light-emitting diode ("LED") module and a frame separately, so that each separated part is stable and is capable of simple use and assembly.

In one aspect of the present invention, a backlight unit of a direct type includes a plurality of makeup LED modules including an LED package of a direct type on a printed circuit board ("PCB") and a heat sink under the PCB releasing heat generated from driving the LED package of the direct type, a reflection plate reflecting light emitted from the makeup LED module to a front face, and attached at the remaining surface except for the makeup LED packages, an optical sheet disposed on the reflection plate, and improving brightness and uniformity of the light emitted from the makeup LED module and the reflection plate, and guide the light into a front face of the optical sheet and a frame including a guide rail to combine the makeup LED module by a sliding combination.

In an exemplary embodiment, the backlight unit of the direct type may further include a guide rail combination part disposed at a side face of the makeup LED module to combine with the guide rail of the frame by a sliding combination.

In an exemplary embodiment, the guide rail combination part may be formed at the heat sink attached to a lower part of the PCB of the makeup LED module.

In an exemplary embodiment, the frame may include a first, a second, a third and a fourth outline frames of an upper, a lower, a left and a right surfaces to combine the makeup LED module, the reflection plate and the optical sheet by a sliding combination; and a fifth center frame separating combination surfaces, which are formed by the first, the second, the third and the fourth of the upper, the lower, the left and the right surfaces, into two symmetrical parts so as to combine the makeup LED module into the two parts by a sliding combination.

In an exemplary embodiment, cross-sections of the guide rails of the first, the second, the third and the fourth outline frames of the upper, the lower, the left and the right surfaces may be formed as 'U' shape extended toward an inside of each frame.

In an exemplary embodiment, the fifth center frame may include guide rails at both sides of the fifth center frame, the guide rails being lower than the heat sink of the makeup LED module, so as not to separate from the makeup LED module when the makeup LED modules are disposed at both sides with respect to the fifth center frame and combined by a sliding combination.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE PREFERRED EMBODIMENTS

Figure 1:
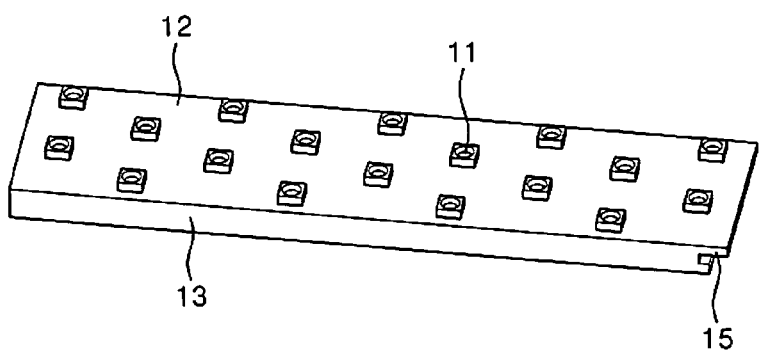
FIG. 1 is a perspective view illustrating a markup light-emitting diode ("LED") module of a backlight unit of a direct type in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
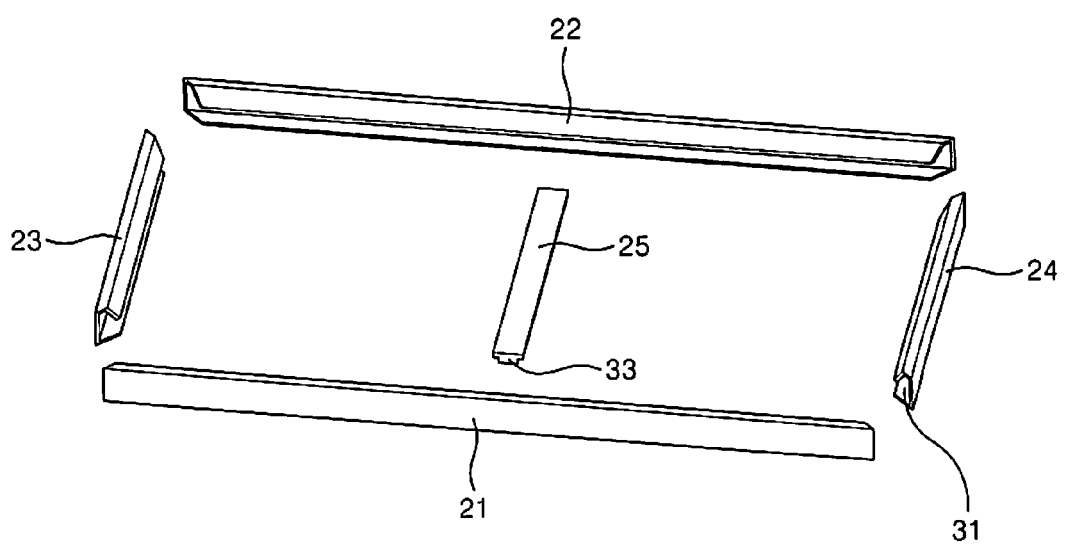
FIG. 2 is a perspective view illustrating a frame of a backlight unit of a direct type in accordance with an embodiment of the present invention.
Figure 3:
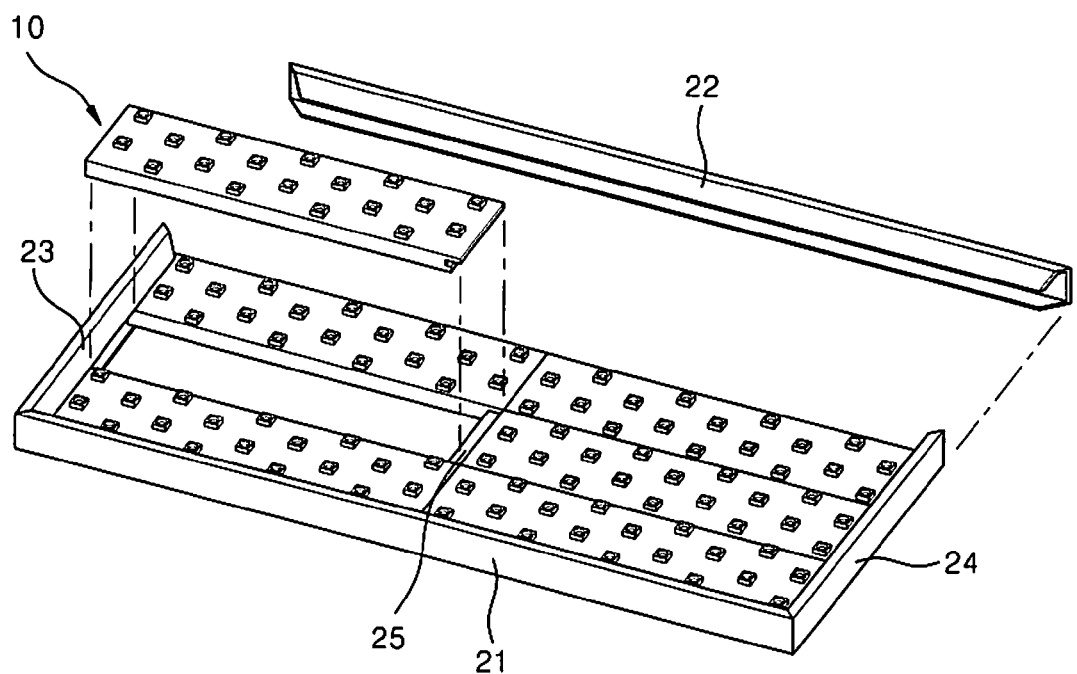
FIG. 3 is a perspective view showing an embodiment of assembling a backlight unit of a direct type in accordance with an embodiment of the present invention.
Figure 4:
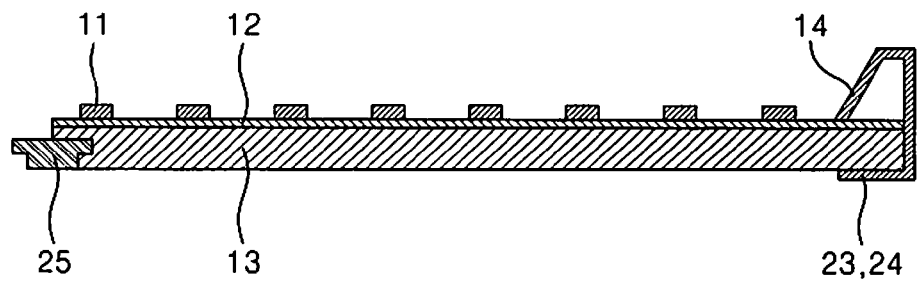
FIG. 4 is a partial cross-sectional view illustrating a backlight unit of a direct type in accordance with an embodiment of the present invention.
Figure 5A:
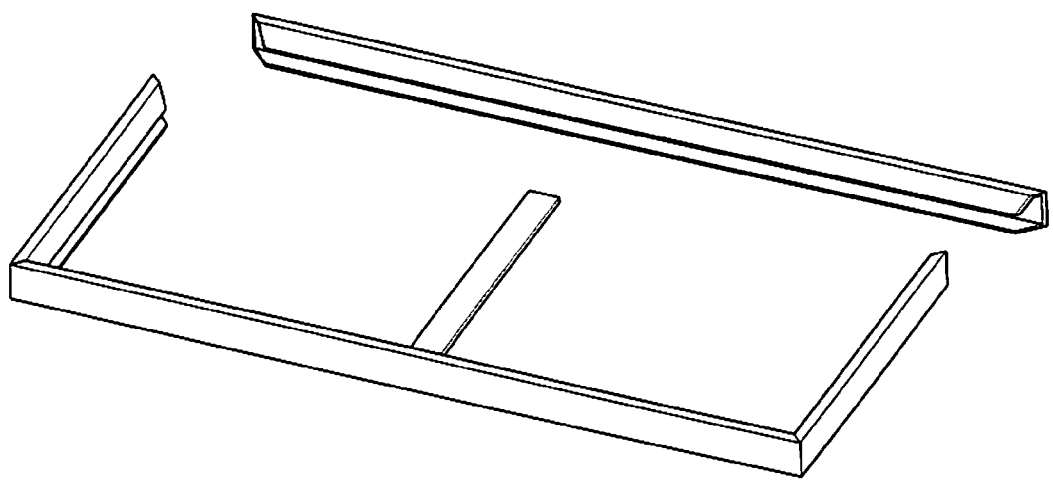
FIGS. 5A to 5D are perspective views showing a assembly process of a backlight unit of a direct type in accordance with an embodiment of the present invention.
Figure 5B:
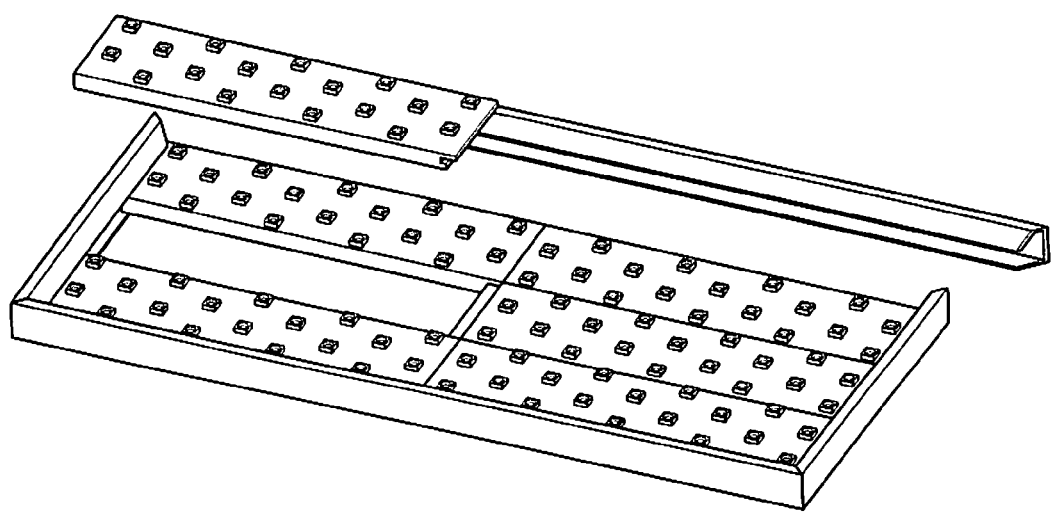
Figure 5C:
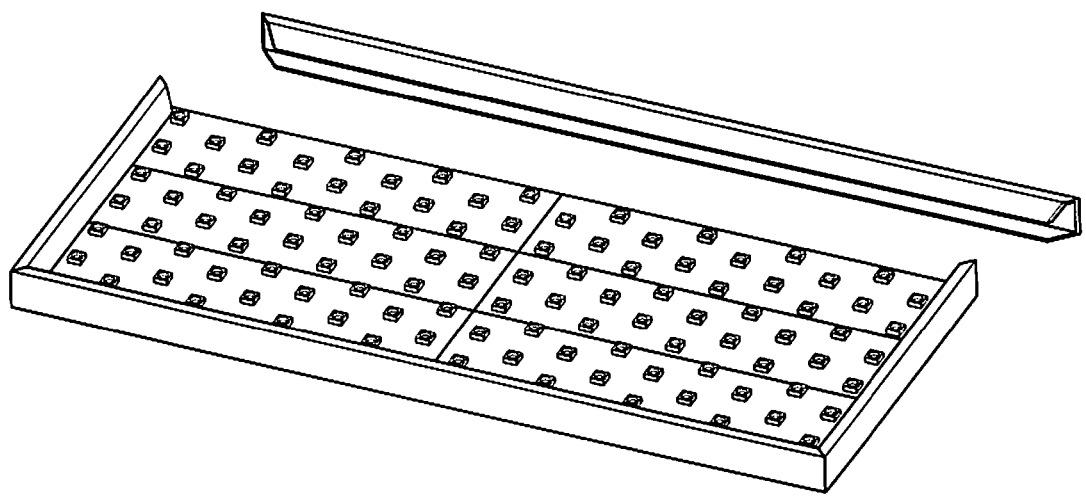
Figure 5D:
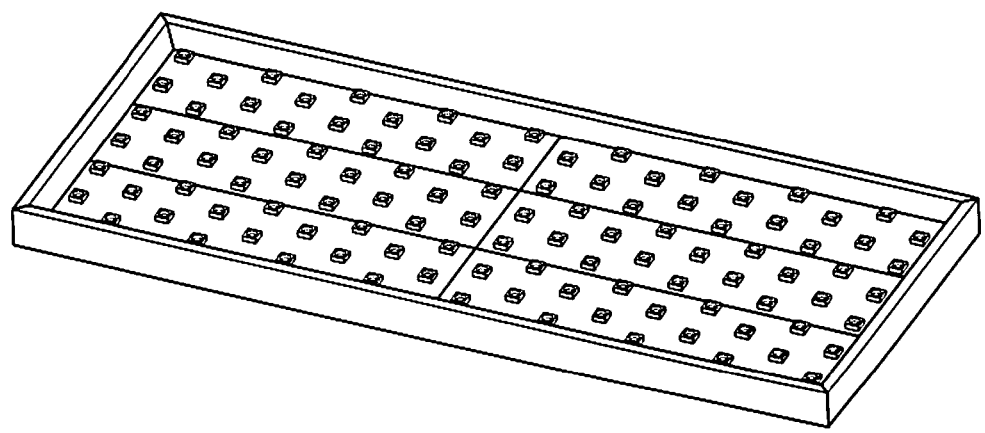

FIG. 1 is a perspective view illustrating a makeup light-emitting diode ("LED") module of a backlight unit of a direct type in accordance with an embodiment of the present invention. FIG. 2 is a perspective view illustrating a frame of a backlight unit of a direct type in accordance with an embodiment of the present invention. FIG. 3 is a perspective view showing an embodiment of assembling a backlight unit of a direct type in accordance with an embodiment of the present invention. FIG. 4 is a partial cross-sectional view illustrating a backlight unit of a direct type in accordance with an embodiment of the present invention. FIGS. 5A to 5D are perspective views showing a assembly process of a backlight unit of a direct type in accordance with an embodiment of the present invention.

A backlight unit in accordance with an embodiment of the present invention, includes a plurality of makeup LED modules 10, a reflection plate 14, an optical sheet, and frames 21, 22, 23, 24, and 25. In the makeup LED module 10, a plurality of LED packages 11 of a direct type is attached to an upper part of a printed circuit board ("PCB"), and a heat sink 13 is attached at a lower part of the PCB. The heat sink 13 releases heat generated as the LED package of the direct type is driven. The reflection plate 14 reflects light emitted from the makeup LED module 10 to a front face, and is attached at the remaining surface except for the makeup LED packages 11. The optical sheet is disposed on the reflection plate, and improves brightness and uniformity of the light, which is emitted from the makeup LED module and the reflection plate to guide the light into a front face of the optical sheet. Guide rails are formed at the frames 21, 22, 23, 24 and 25 to combine the makeup LED module 10 by a sliding combination.

A guide rail combination part 15 is disposed at a side face of the makeup LED module 10 to combine with the guide rails of the frames 21, 22, 23, 24 and 25 by a sliding combination.

Moreover, the guide rail combination part 15 of the makeup LED module 10 may be formed at the heat sink 13, which is attached to a lower part of the PCB 12 of the makeup LED module 10.

The frame includes a first, a second, a third and a fourth outline frames 21, 22, 23 and 24 of an upper, a lower, a left and a right surfaces and a fifth center frame 25. The first, the second, the third and the fourth frames 21, 22, 23 and 24 combine the makeup LED module 10, the reflection plate 14 and the optical sheet by a sliding combination. The fifth center frame separates combination surfaces, which are formed by the first, the second, the third and the fourth of the upper, the lower, the left and the right surfaces, into two symmetrical parts so as to combine the makeup LED module into the two parts by a sliding combination.

Moreover, cross-sections of the guide rails of the first, the second, the third and the fourth outline frames 21, 22, 23 and 24 of the upper, the lower, the left and the right surfaces are formed as 'U' shape extended toward an inside of each frame.

The fifth center frame 25 includes guide rails 33 at both sides of the fifth center frame 25, and the guide rails 33 are lower than the heat sink of the makeup LED module, so that a gap between the assembled makeup LED modules 10 is not generated when the makeup LED modules 10 are disposed at both sides with respect to the fifth center frame 25 and combined by a sliding combination.

As described above, when a defect or failure of each component is generated in an assembly process or in a using process of the LCD apparatus having a lot of light sources, the component is replaced by separating and replacing a only part, which needs a replacing work, not by replacing all of the components, which may not need to be replaced. Thus, the maintenance cost and the time may be saved, so that the commercial result is expected.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight unit of a direct type comprising:
    a plurality of makeup Light-Emitting Diode ("LED") modules including an LED package of a direct type on a Printed Circuit Board ("PCB") and a heat sink under the PCB releasing heat generated from driving the LED package of the direct type;
    a reflection plate reflecting light emitted from the makeup LED modules to a front face, and attached at a remaining surface except for the makeup LED packages; and
    the optical sheet disposed on the reflection plate, and improving brightness and uniformity of the light emitted from the makeup LED module and the reflection plate, and guide the light into a front face of the optical sheet;
    a frame including a guide rail for combining the makeup LED modules by a sliding combination; and
    a guide rail combination part disposed at a side face of each makeup LED module to combine with the guide rail of the frame by a sliding combination,
    wherein the guide rail combination part is formed at the heat sink attached to a lower part of the PCB of each makeup LED module.

2. The backlight unit of claim 1, wherein the frame comprises first, second, third, and fourth outline frames of upper, lower, left and right surfaces to combine the makeup LED modules, the reflection plate, and the optical sheet by a sliding combination; and
    a fifth center frame separating combination surfaces, which are formed by the first, the second, the third, and the fourth of the upper, the lower, the left, and the right surfaces, into two symmetrical parts so as to combine the makeup LED modules into the two symmetrical parts by a sliding combination.

3. The backlight unit of claim 2, wherein cross-sections of the guide rails of the first, the second, the third, and the fourth outline frames of the upper, the lower, the left, and the right surfaces are formed as 'U' shape extended toward an inside of each frame.

4. The backlight unit of claim 2, wherein the fifth center frame comprises guide rails at both sides of the fifth center frame, the guide rails being lower than the heat sink of each makeup LED module, so as not to separate from the makeup LED modules when the makeup LED modules are disposed at both sides with respect to the fifth center frame and combined by a sliding combination.

5. A backlight unit of a direct type comprising:
    a plurality of makeup Light-Emitting Diode ("LED") modules including an LED package of a direct type on a Printed Circuit Board ("PCB") and a heat sink under the PCB releasing heat generated from driving the LED package of the direct type;
    a reflection plate reflecting light emitted from the makeup LED module to a front face, and attached at the remaining surface except for the makeup LED packages;
    an optical sheet disposed on the reflection plate, and improving brightness and uniformity of the light emitted from the makeup LED module and the reflection plate, and guide the light into a front face of the optical sheet; and
    a frame including a guide rail for combining with the makeup LED module by a sliding combination,
    wherein the frame comprises first, second, third, and fourth outline frames of upper, lower, left and right surfaces to combine the makeup LED modules, the reflection plate, and the optical sheet by a sliding combination,
    wherein the frame further comprises a fifth center frame separating combination surfaces, which are formed by the first, the second, the third, and the fourth of the upper, the lower, the left, and the right surfaces, into two symmetrical parts so as to combine the makeup LED modules into the two symmetrical parts by a sliding combination, and
    wherein cross-sections of the guide rails of the first, the second, the third, and the fourth outline frames of the upper, the lower, the left, and the right surfaces are formed as 'U' shape extended toward an inside of each frame.

6. A backlight unit of a direct type comprising:
    a plurality of makeup Light-Emitting Diode ("LED") modules including an LED package of a direct type on a Printed Circuit Board ("PCB") and a heat sink under the PCB releasing heat generated from driving the LED package of the direct type;
    a reflection plate reflecting light emitted from the makeup LED module to a front face, and attached at the remaining surface except for the makeup LED packages;
    an optical sheet disposed on the reflection plate, and improving brightness and uniformity of the light emitted from the makeup LED module and the reflection plate, and guide the light into a front face of the optical sheet; and
    a frame including a guide rail for combining with the makeup LED module by a sliding combination,
    wherein the frame comprises first, second, third, and fourth outline frames of upper, lower, left and right surfaces to combine the makeup LED modules, the reflection plate, and the optical sheet by a sliding combination, wherein the frame further comprises a fifth center frame separating combination surfaces, which are formed by the first, the second, the third, and the fourth of the upper, the lower, the left, and the right surfaces, into two symmetrical parts so as to combine the makeup LED modules into the two symmetrical parts by a sliding combination, and wherein the fifth center frame comprises guide rails at both sides of the fifth center frame, the guide rails being lower than the heat sink of each makeup LED module, so as not to separate from the makeup LED modules when the makeup LED modules are disposed at both sides with respect to the fifth center frame and combined by a sliding combination.

* * * * *